United States Patent [19]
Haldric et al.

[11] Patent Number: 5,092,145
[45] Date of Patent: Mar. 3, 1992

[54] KEEPER FOR A LOCK FOR THE ROTATIONAL BLOCKING OF A SHAFT AND ITS USE ON MOTOR VEHICLE STEERING COLUMN ANTI-THEFT DEVICES

[75] Inventors: Bernard Haldric; Grégorio Benedi; Sylvie Baudon neé Chardon; Bernard Sevault, all of Vendome, France

[73] Assignee: Nacam, Vendome, France

[21] Appl. No.: 473,302

[22] Filed: Jan. 31, 1990

[30] Foreign Application Priority Data

Feb. 1, 1989 [FR] France ................................ 8901294

[51] Int. Cl.⁵ .............................................. B60R 25/02
[52] U.S. Cl. ........................................ 70/185; 70/186; 70/252; 74/492; 74/527; 74/552
[58] Field of Search ................................ 70/182-186, 70/252; 74/492, 552, 527

[56] References Cited

U.S. PATENT DOCUMENTS

| | | | |
|---|---|---|---|
| 1,748,350 | 2/1930 | Jacobs | 70/185 |
| 1,772,747 | 8/1930 | Croning | 70/185 |
| 2,868,007 | 1/1959 | Neiman et al. | 70/185 |
| 3,566,633 | 3/1971 | Borck | 70/252 |

FOREIGN PATENT DOCUMENTS

| | | | |
|---|---|---|---|
| 0035415 | 9/1981 | European Pat. Off. | 70/182 |
| 0129522 | 12/1984 | European Pat. Off. | 70/252 |
| 0204621 | 12/1986 | European Pat. Off. | |
| 0216651 | 4/1987 | European Pat. Off. | |
| 0240724 | 10/1987 | European Pat. Off. | 70/252 |
| 3435084 | 4/1986 | Fed. Rep. of Germany | |
| 2161392 | 6/1973 | France | |
| WO8304227 | 12/1983 | PCT Int'l Appl. | 70/185 |
| 572566 | 10/1945 | United Kingdom | 70/252 |

*Primary Examiner*—Lloyd A. Gall
*Attorney, Agent, or Firm*—Robert E. Burns; Emmanuel J. Lobato

[57] ABSTRACT

The lock keeper intended to be mounted on the periphery (11) of a shaft (10) comprises discs (21), each pierced through with a central orifice (210) intended for receiving this shaft (10) in order to stack them on it, and is made integral in terms of rotation with this shaft (10) by means of an interlock (30) consisting of at least one projection (31)/notch (32) pair, of which one is formed in this central orifice (210) and the other is formed on the periphery (11) of this shaft (10), some of these discs (21) being equipped at their edge (211) with at least one indentation (212), these indentations (212) being intended to be aligned longitudinally so as to produce a receptacle (23) for receiving a bolt (12).

The invention is used in the motor-vehicle industry.

6 Claims, 2 Drawing Sheets

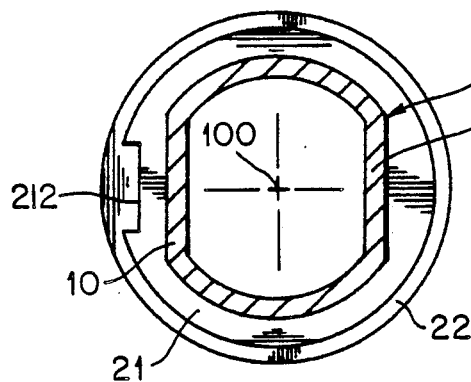
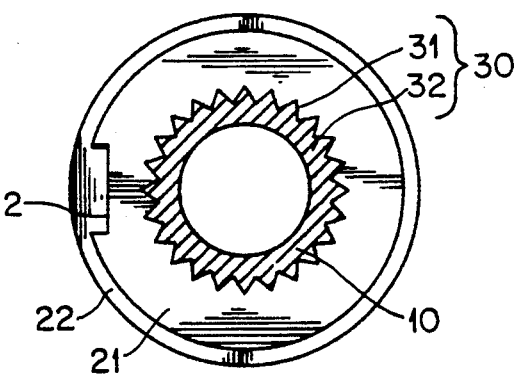
FIG. 3A  FIG. 3B
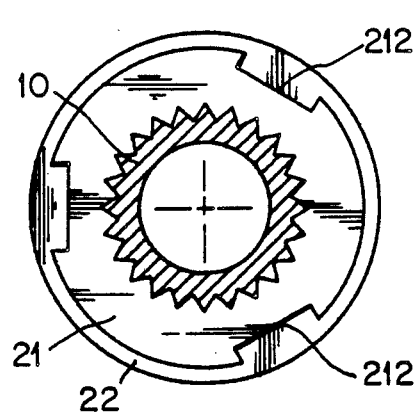
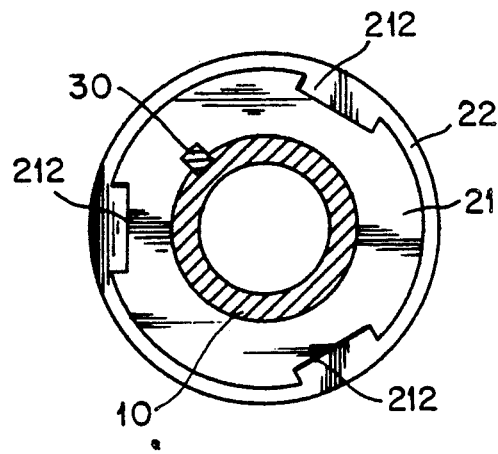
FIG. 3C  FIG. 3D

5,092,145

KEEPER FOR A LOCK FOR THE ROTATIONAL BLOCKING OF A SHAFT AND ITS USE ON MOTOR VEHICLE STEERING COLUMN ANTI-THEFT DEVICES

FIELD OF THE INVENTION

The present invention relates to locks for the rotational blocking of a shaft, especially of the type used for motor-vehicle anti-theft devices located on the steering column.

The subjects of the invention are, more particularly, a keeper for a lock for the rotational blocking of a shaft rotatable about its axis and its use on motor-vehicle steering column anti-theft devices.

In many technical sectors, it is necessary to be able to ensure the rotational blocking of a shaft rotatable about its axis by means of a lock controlled by a key, so that this shaft can be immobilized or left free, as required.

BACKGROUND OF THE INVENTION

This type of use is relatively common, especially in the motor-vehicle industry where an anti-theft lock conventionally makes it possible to block the steering column of a vehicle when its driver leaves it. For such a use, the bolt of the lock is controlled by a key in such a way as to be displaceable in a fixed case approximately perpendicular relative to the axis of a shaft of the steering column, in order to engage with or disengage from a receptacle of a keeper integral in terms of rotation with the shaft. In this type of anti-theft lock, it is relatively common to produce a keeper which takes the form of a tubular sleeve or of two semicylindrical half-shells which are attached to the shaft and fastened to the latter so as to be integral with this in terms of rotation. This fastening is usually obtained by welding. Such a keeper is equipped, on its periphery, with a receptacle generally approximately parallel to the generatrices of the shaft, into which the bolt of the lock controlled by the key can engage.

The manufacture of such locks, especially of the keeper, presents many problems, particularly because the shaft of the steering column to which it is intended to be secured has to conform to relatively standardized specifications. This is true especially of the inside and outside diameters and therefore of the thickness of the hollow shaft and the grades of the material from which this shaft is made. Under such conditions, the fastening of a keeper to a relatively thin hollow shaft presents technical problems in manufacturing terms and economic problems in terms of cost.

SUMMARY OF THE INVENTION

The object of the invention is to manufacture a keeper for a lock for the rotational blocking of a shaft rotatable according to its axis, by means of a bolt moveable approximately perpendicularly relative to this axis, especially for the purpose of using it on motor-vehicle steering column anti-theft devices, the said keeper not having any disadvantages of the type mentioned above.

One subject of the invention is a keeper for a lock for the rotational blocking of a shaft rotatable about its axis, by means of a bolt moveable in a fixed case approximately perpendicularly relative to this axis, this keeper being intended to be mounted on the periphery of this shaft. This keeper is characterized in that it comprises discs, each pierced through with a central orifice intended for receiving this shaft in order to stack them on it, in that it is intended to be made integral in terms of rotation with this shaft by means of an interlock consisting of at least one projection/notch pair, of which one is formed in this central orifice and the other is formed on the periphery of this shaft, in that at least some of these discs are equipped at their edge with at least one indentation, and in that these indentations are intended to be aligned longitudinally so as to produce a receptacle intended to receive the bolt.

Another subject of the invention is the use of such a lock keeper especially on a motor-vehicle steering-column anti-theft device.

BRIEF DESCRIPTION OF THE DRAWINGS

Other characteristics of the invention will emerge from reading the following description and claims and from examination of the accompanying drawing which is given solely by way of example and in which

FIGS. 3A, 3B, 3C, 3D are sectional view of different embodiments of a keeper according to the invention taken in a plane perpendicular relative to the axis of the shaft.

DESCRIPTION OF THE PREFERRED EMBODIMENTS

Figure 1:
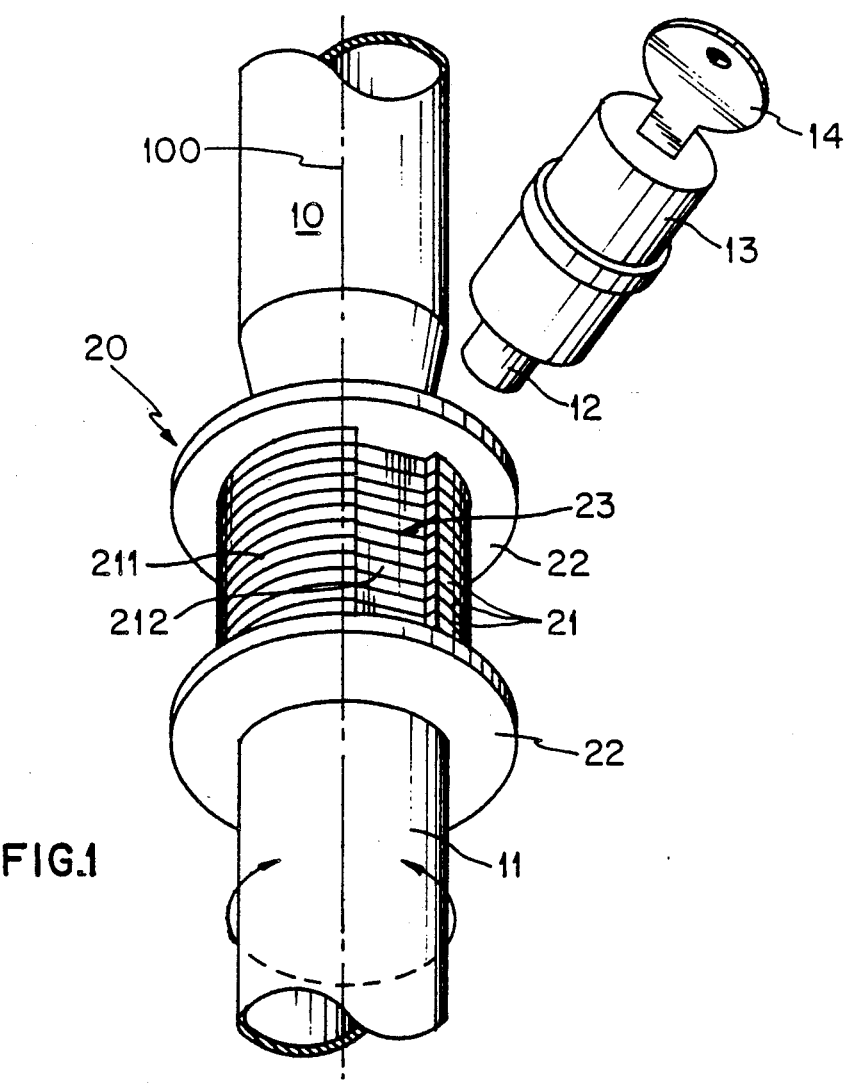
FIG. 1 is a diagrammatic perspective view of an embodiment of a keeper according to the invention for a lock for the rotational blocking of a shaft rotatable according to its axis.
Figure 2:
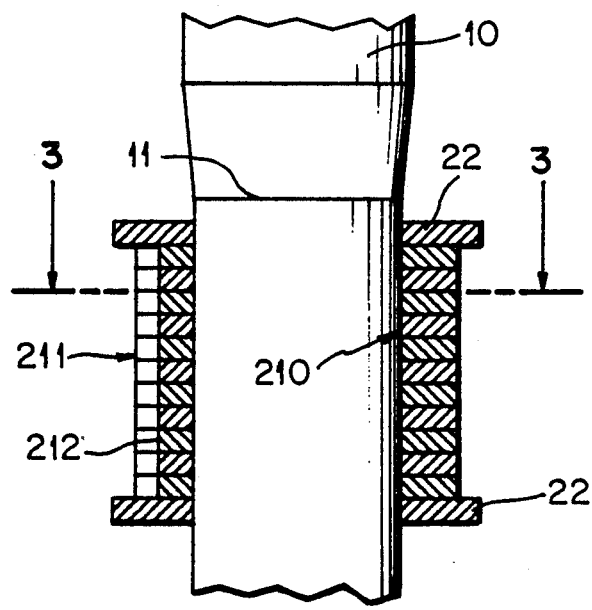
FIG. 2 is a mid-section through the embodiment of FIG. 1 in an plane passing through the indentations delimiting the receptacle for the bolt.

Since locks for the rotational blocking of a shaft rotatable according to its axis, particularly their keeper, and especially locks for motor-vehicle steeringcolumn anti-theft devices are well known, only what relates to the invention will be described hereafter. For the rest, a person skilled in the relevant art can draw from current conventional solutions available to him, in order to deal with the particular problems with which he is faced.

In the following, the same reference numeral will always denote the same corresponding element, whatever the embodiment.

In the following description and in the figures relating to it, it will be assumed that the keeper for a lock for the rotational blocking of a shaft rotatable about its axis by means of a bolt moveable in a fixed case approximately perpendicularly relative to this axis concerns a motor-vehicle steering column anti-theft device. It is clear, however, that the lock keeper according to the invention can be put to many other uses.

As can be seen in the figures of the drawing, a preferably hollow shaft 10 with an axis 100 has a periphery 11 to which a keeper 20 of a lock according to the invention will be secured. This keeper 20 is intended to be detained or released by means of the bolt 12 of a lock which comprises a fixed case 13; this bolt is moveable in this case in such a way as to be displaceable approximately perpendicularly relative to the axis 100 of the shaft, preferably radially. This is relatively conventional, and no further details of this will be given. The actuation of the bolt is controlled in the customary way by means of a key 14. The key, case and bolt are drawn diagrammatically.

As can be seen clearly in the figures of the drawing, the keeper 20 consists of discs 21; each of these discs is pierced with a central orifice 210 and carries an indentation 212 on its edge 211. These discs are intended to be slipped onto the periphery 11 of the shaft 10 and stacked there, as shown in FIG. 1.

When the discs 21 are stacked on the shaft 10, their indentations 212 are aligned with one another, so as to delimit a receptacle 23, into which the bolt 12 of the lock can engage in order to prevent any rotation of the shaft according to its axis; this rotation is represented diagrammatically by a double arrow in FIG. 1.

These discs are immobilized in terms of rotation on the periphery of the shaft by means of an interlock 30 consisting of at least one pair of abutment surfaces, of which one is formed in this central orifice 210 of each of the discs 21 and the other is formed on this outer periphery 11 of this shaft 10.

As can be seen in the section of FIG. 3A of one embodiment, the interlock 30 comprises a surface 31 on the discs and a surface 32 on the shaft, these being formed by mutually complementary flats preferably diametrically opposite one another.

In the embodiment of FIG. 3B, this interlock 30 consists of mutually complementary splines, some formed on the periphery 11 of the shaft, these being formed by mutually complementary flats preferably diametrically opposite one another.

In the embodiment of FIG. 3B, this interlock 30 consists of mutually complementary splines, some formed on the periphery 11 of the shaft and the others on the inside of the orifice 210 of the discs.

The embodiment illustrated in FIG. 3C differs from that shown in FIG. 3B simply in that there is a plurality of indentations 212 preferably equidistant from one another; as can be seen, three indentations equidistant from one another at 120° have been produced. This solution makes it possible to block the steering column, without having to return it systematically into a specific position; this makes it easier to use the anti-theft device, as is well known.

According to another alternative version shown in FIG. 3D the interlock consists of a wedge 30 engaged in corresponding recess of the shaft and of the discs, for example of the type known in the trade by the designation "Nadello K".

Referring to FIG. 1, it will be seen there that of the discs located at the ends of the stack have an outside equal diameter larger than the diameter of the other underlying discs. In this embodiment, the two discs 22 located at the ends of the stack have diameters larger than those of the other discs, but it is clear that only one of these discs can be of larger diameter. These end discs are preferably free of indentations.

The reason why at least one of these two end discs is of larger diameter will now be explained. As is conventional, a steering column, when it is ready for use, comprises a shaft engaged in a tubular jacket in which it rests at its ends by means of bearings, usually ball-bearings. When such a steering column is immobilized in terms of rotations as a result of the engagement of the bolt into the receptacle of the keeper secured to the shaft and it undergoes standardized tests, the torque to which it is subjected generates a radial component in the bearings as a result of the meeting between the bolt and the receptacle of the keeper and the buttressing resulting from this. This radial component tends to cause the shaft to bend in the region of the bolt, and this bending tends to bring about a disengagement or separation of the keeper from the bolt. To prevent this, the end disc or end discs are of a larger diameter selected so that these normally do not bear on the inner wall of the cylindrical jacket in which the shaft is engaged, but are located in the immediate vicinity of this. It will thus be appreciated that, during test, when the shaft tends to bend, the edge of the discs of largest diameter comes to bear on the inner wall of the nearby jacket and thereby ensures a reaction to the radial component.

The stack of discs of the keeper is immobilized axially on the shaft in any suitable way, for example, by blocking, wedging or welding of the end discs.

Preferably, the discs of the lock keeper according to the invention are manufactured by the cutting out and stamping of a suitable metal sheet, so as to be obtained directly ready for use and assembly.

The shaping of the shaft to form on it the part of the interlock which it is to carry is conventional; for example, rolling or dye stamping is employed.

The great usefulness of the invention will therefore be appreciated, since the keeper thus obtained is a direct result of a conventional and relatively easy operation of working the metal sheet and since it requires no additional operation other than the axial fastening.

We claim:

1. Anti-theft lock mechanism for a motor vehicle steering column comprising,
   a shaft rotatable about its axis and having an outer periphery,
   a fixed case with a bolt movable approximately perpendicularly relative to the axis of said shaft, and
   a keeper mounted on said shaft and comprising a stack of contiguous like discs each having a central opening of a diameter to receive said shaft, said opening defining an inner periphery of the disc which engages the outer periphery of said shaft, said discs having on their inner peripheries abutment surfaces which cooperate with abutment surfaces on the outer periphery of said shaft to fix said discs rotationally on said shaft,
   said discs having in their outer peripheries recesses which are aligned axially with one another to provide a receptacle for receiving said bolt.

2. Anti-theft lock mechanism according to claim 1, in which said shaft has a flat side on its outer periphery and said discs have corresponding flat sides in their inner peripheries.

3. Anti-theft lock mechanism according to claim 1, in which said shaft is splined to provide in its outer periphery a plurality of axially extending grooves alternating with axially extending ribs, and in which said discs have in their inner peripheries alternate teeth and notches mating respectively with the grooves and ribs on the outer periphery of said shaft.

4. Anti-theft lock mechanism according to claim 1, in which at the ends of said stack of discs there are discs of larger diameter which do not have said recesses in their outer peripheries.

5. Anti-theft lock mechanism according to claim 1, in which a wedge is engaged in a recess in the outer periphery of said shaft and in recesses in inner peripheries of said discs.

6. Anti-theft lock mechanism according to claim 1 in which discs of said stack of discs have in their outer peripheries a plurality of recesses which are axially aligned to form a corresponding plurality of angularly spaced receptacles for receiving said bolt.

* * * * *